(12) United States Patent
Kroeze et al.

(10) Patent No.: US 6,169,147 B1
(45) Date of Patent: Jan. 2, 2001

(54) BLOCK COPOLYMER

(75) Inventors: Erik Kroeze, Groningen; Georges Hadziioannou; Gerrit ten Brinke, both of Peize, all of (NL)

(73) Assignee: Rijksuniversiteit te Groningen (NL)

( * ) Notice: Under 35 U.S.C. 154(b), the term of this patent shall be extended for 0 days.

(21) Appl. No.: 09/202,835

(22) PCT Filed: Jun. 24, 1997

(86) PCT No.: PCT/NL97/00353

§ 371 Date: Mar. 22, 1999

§ 102(e) Date: Mar. 22, 1999

(87) PCT Pub. No.: WO97/49742

PCT Pub. Date: Dec. 31, 1997

(30) Foreign Application Priority Data

Jun. 25, 1996 (NL) .................................................. 1003422

(51) Int. Cl.[7] .................................................. C08L 53/02
(52) U.S. Cl. .................... 525/285; 525/207; 525/240; 525/66; 525/98
(58) Field of Search .................................. 525/285, 207, 525/240, 66, 98

(56) References Cited

U.S. PATENT DOCUMENTS 5,278,231 * 1/1994 Chundury .............................. 525/66
5,321,081 * 6/1994 Chundury .............................. 525/98

* cited by examiner

Primary Examiner—James J. Seidleck
Assistant Examiner—Olga Asinovsky
(74) Attorney, Agent, or Firm—Norris, McLaughlin & Marcus P.A.

(57) ABSTRACT

The present invention relates to a block copolymer comprising at least one polyalkadiene block which may or may not be hydrogenated and at least one random (aromatic vinyl compound-co-maleic anhydride) block. Besides, the invention relates to a stable polymer composition comprising a continuous phase formed by a first polymer and a phase dispersed therein of a second polymer, which second polymer is not compatible with the first polymer, and an amount of the block copolymer according to the invention, the ratio of the block copolymer to the second polymer ranging between 1:50 and 1:5. Finally, the invention relates to the use of the block copolymers according to the invention as compatibilizer and/or as modifier for the mechanical properties of polymer compositions.

10 Claims, 2 Drawing Sheets

BLOCK COPOLYMER

BACKGROUND OF THE INVENTION

1. Field of the Invention

The present invention relates to a specific block copolymer and to a polymer composition comprising a continuous phase formed by at least a first polymer and a second phase dispersed therein of at least a second polymer, which second polymer is not compatible with the first polymer, in which polymer composition the specific block copolymer is included.

Besides, the invention relates to the use of the specific block copolymer as impact modifier in polymer composition.

The invention further relates to specific triblock copolymers.

Mixtures of polymers can in principle give a wide variety of mechanical properties by adjusting the type and the amount of polymers in mixtures. In particular, mixtures are prepared for the purpose of modifying the impact strength, in particular at lower temperatures, the dimensional stability and/or the processability.

Besides, when reprocessing polymers, mixtures of different polymers are often obtained. In fact, a waste fraction will seldom consist 100% of the same polymer.

However, most polymers show no proper miscibility with other polymers, so that no homogeneous product is formed, but a polymer product with many (macroscopic) domains formed by the individual polymers. Such products have no good mechanical properties, in particular not as regards ductility.

2. Description of the Related Art

In the prior art a lot of research has been done on block copolymers that can be used as compatibilizing agent for mixtures of polymers, in particular of homopolymers, which per se do not mix together; and as modifier for specific mechanical properties of polymers. Compatibilizing agents reduce the interfacial tension between the immiscible components, so that the polymer mixture can form a dispersion with much smaller domains. These dispersions often show improved ductility.

In spite of the large number of research studies from the prior art it is still not completely clear which criteria a block copolymer must satisfy so as to act as an effective compatibilizing agent. Besides simple diblock copolymers which, on the basis of theoretical predictions, should have the most effective compatibilizing activity, different more complex copolymers have been proposed. Thus, in the prior art random copolymers, graft copolymers, tapered diblock copolymers and low molecular triblock copolymers are proposed the effectiveness of which is higher than that of the simple diblock copolymers.

An attractive manner of compatibilizing is the forming in situ of block copolymers or graft copolymers via interfacial reactions with functionalized polymers during mixing in the melt, e.g. by melt kneading, of polymers. This so-called reactive compatibilization has been discussed in different places in the prior art, e.g. by Wu in Polymer 26 (1985) 1855; by Armat et al in Polymer 34 (1993) 977, and by Yeh et al., Polym. Bull. 35 (1995) 371.

SUMMARY THE INVENTION

The present invention substantially relates to polymer mixtures based on polyamides, in particular nylons. These synthetic materials form an attractive class of polymers for engineering uses. However, they possess a number of disadvantageous properties. Thus, this material is rather brittle, readily absorbs much moisture, and is dimensionally hardly stable. To improve these properties, polyamides are mixed with other polymers, e.g. with polyphenyleneoxide (PPO), acrylonitrile/butadiene/styrene copolymers (ABS), polyalkenes, polycarbonate and rubbers. The improvement of the above properties often involves a loss of mechanical properties, so that measures for compatibilization are required.

According to the invention a class of block copolymers has now been found which are eminently suited for compatibilizing synthetic mixtures on the basis of polyamides and for modifying polyamide compositions. These block copolymers comprise at least one polyalkadiene block and at least one (aromatic vinyl compound-co-maleic anhydride) block.

More in particular, the invention relates to a block copolymer comprising at least one polyalkadiene block and at least one random (aromatic vinyl compound-co-maleic anhydride) block.

Block copolymers of, e.g., polybutadiene (PB) and polystyrene (PS) are used for compatibilizing, inter alia, polyethylene/polystyrene and polypropylene/polystyrene mixtures. These block copolymers are usually prepared by anionic techniques. Anionic techniques have a number of evident disadvantages. They require strict polymerization conditions, e.g. very pure monomers, an absolute moisture- and oxygen-free atmosphere and cryogenic temperatures. These conditions are hard to realize on an industrial scale.

Moreover, no random copolymers can be obtained by using anionic techniques.

European patent application 0 418 118 describes copolymers prepared by using iniferters.

In an article in Polym. J. 17 (1985) 97, Otsu and Kuriyama describe a process in which random and alternating copolymer sequences could be prepared by using the iniferter technique.

Figure 1:
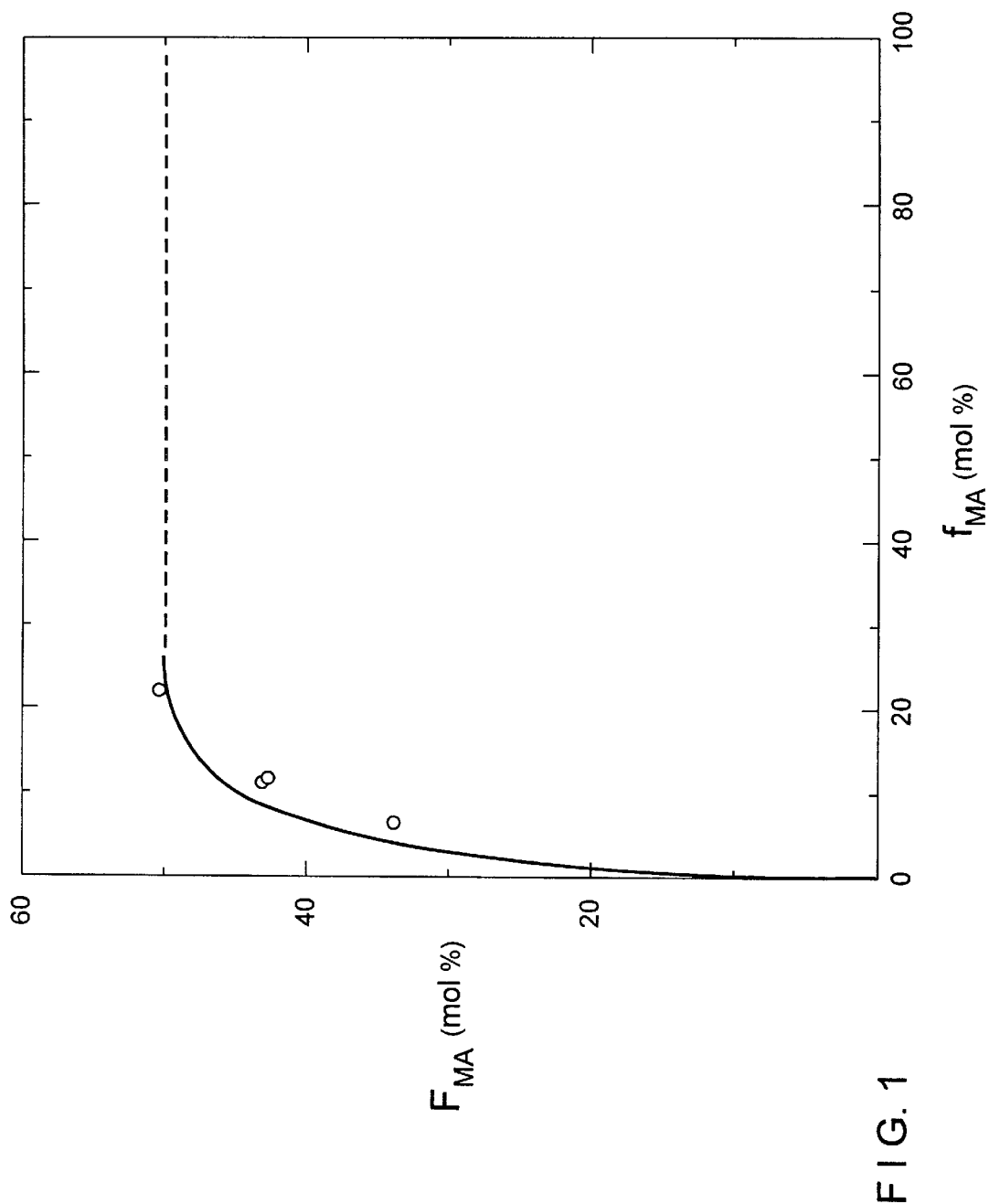
FIG. 1 is a graph showing the maleic anhydride content in the copolymer block vs. the monomer composition.
Figure 2:
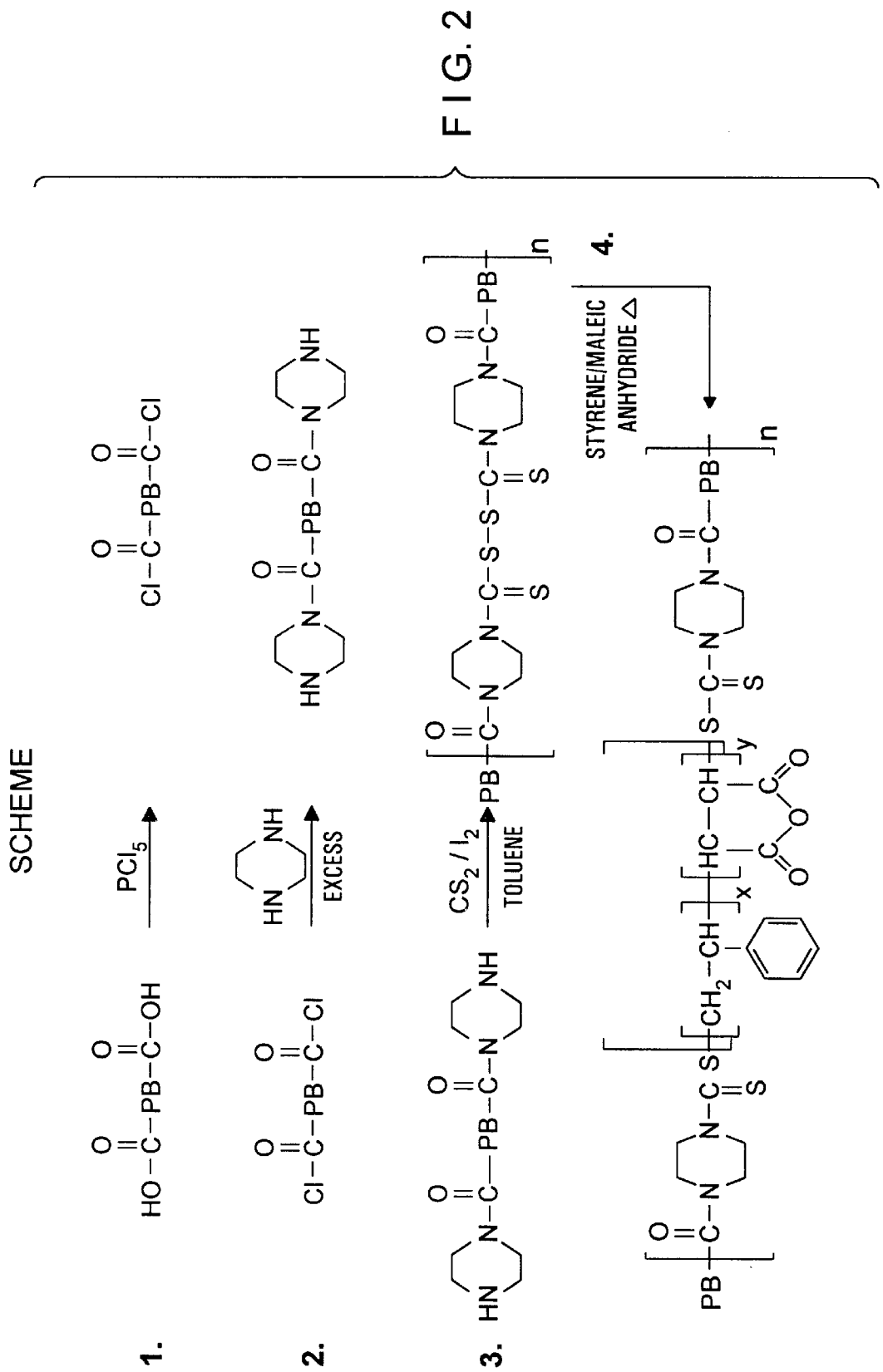
FIG. 2 shows a scheme for preparation of an iniferter polymer based on dihydroxy polybutadiene, and of a segmented block copolymer.

By the term "iniferter" are designated specific free radical initiators which simultaneously also function as chain transfer agent and as polymer radical terminator.

DETAILED DESCRIPTION OF THE PREFERRED EMBODIMENT

The block copolymers according to the present invention comprising blocks of polyalkadiene which may or may not be hydrogenated and poly(aromatic vinyl compound-co-maleic anhydride), form very effective compatibilizers and modifiers for different mechanical properties and are in particular very effective impact modifiers. This particularly applies when used in polymer mixtures containing polyamides. Polyamides contain amine and carboxy end groups as well as amide bonds, which groups are per se of a reactive nature. The above groups enable a reactive compatibilization with the polymer units derived from maleic anhydride.

However, the block copolymers also enable reactive compatibilization in compositions containing other polymers with reactive groups reacting with maleic anhydride units, such as amine, carboxy, hydroxide end groups and/or side groups. Examples of such other polymers are polyesters and polyethers.

Besides, the random composition of the available aromatic vinyl compound maleic anhydride blocks ensures optimum miscibility with specific groups of polymers. Examples of these groups of polymers are polycarbonates and styrene-acrylonitrile copolymers.

The polyalkadiene blocks which may or may not be hydrogenated ensure a proper miscibility with still other polymer groups, such as polyalkenes.

Furthermore, the invention relates to compositions in which the block copolymer according to the invention is combined with at least one other polymer. The block copolymer according to the invention is then present in an amount of 0.2–10 wt. %, more preferably in an amount of 0.5–6 wt. %, most preferably in an amount of 1–3 wt. %, based on the weight of the total composition.

Beside the block copolymer according to the invention, these compositions may comprise one or more polymers.

In a preferred embodiment the invention relates to a stable polymer composition comprising a continuous phase formed by at least a first polymer and a phase dispersed therein of at least a second polymer, which second polymer is not compatible with the first polymer, and an amount of the block copolymer according to the invention, the weight ratio of the block copolymer to the second polymer ranging between 1:50 and 1:5.

However, this is only a preferred morphology. With blends that possess no dispersion morphology, an excellent compatibilization is also found.

The compatibilizing properties of these block copolymers are substantially better than those of known copolymers, such as copolymers in which random copolymer blocks are grafted onto a polymer chain. In the case of using known compatibilizing agents in amounts of 5–10 wt. % and more based on the complete composition containing at least two non-compatible polymers, an amount of about 1 wt. % is sufficient when using the block copolymers according to the present invention.

For the function of reactive compatibilizer in mixtures of polyalkenes with polyamides, such as nylons, it is sufficient if only a few percents of units derived from maleic anhydride are present in the random polymer block. In particular, excellent results are obtained if the SMA block contains up to 6 wt. %, more preferably 0.2–5 wt. %, most preferably 1–2 wt. % maleic anhydride units.

The same applies to mixtures of polyalkenes with any other polymer containing groups with which maleic anhydride units can react, and in particular polymers with amine, hydroxy and carboxy end groups and/or side groups. In these mixtures the block copolymer according to the invention is used in hydrogenated form.

In another embodiment the block copolymer is used as reactive compatibilizer in non-hydrogenated form in a mixture containing ABS in combination with polyamide or other types of polymers containing end and/or side groups which react with maleic anhydride units. For this embodiment 15–40 wt. %, and more preferably 20–35 wt. %, maleic anhydride units are present in the random block of the block copolymer so as to obtain sufficient mixing with at least the styrene-acrylonitrile phase of ABS polymers.

Moreover, the block copolymer according to the present invention functions as an excellent modifier of mechanical properties of polymers which can react with maleic anhydride units. Thus, the impact strength at low temperatures of polyamides, such as nylons, polycarbonates and polybutene terephthalate/polycarbonate mixtures, is substantially improved.

Furthermore, the copolymer according to the invention proves to be an effective emulsifier for the rubber phase in rubber-modified polyamides, polycarbonates and other polymers with groups reacting with maleic anhydride units. Thus, it turns out that the impact strength of such composition is strongly improved if 0.5–5 wt. %, more preferably 1–4 wt. %, block copolymer is added to the composition. This is caused by reducing the volume of the rubber phase globules, which gives a homogeneous dispersion.

The random copolymer block present in the copolymer, and also designated in this specification by the term SMA block, used according to the present invention, is built up from at least maleic anhydride units and units of an aromatic vinyl compound.

The aromatic vinyl compound to be used can be represented by formula I,

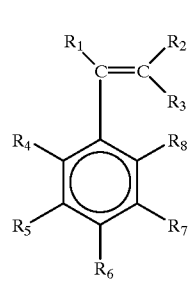

(I)

in which $R_{1-3}$ are independently selected from a hydrogen atom, a $C_{1-4}$ alkyl group or a $C_{1-4}$ alkyl group substituted with an inert group; and in which $R_{4-8}$ independently represent a hydrogen atom, a halogen atom, a $C_{1-4}$ alkyl group or a $C_{1-4}$ alkyl group substituted with an inert group.

Preferably, the aromatic vinyl compound is styrene.

The SMA blocks of the above random copolymers that can be used according to the present invention are miscible with polymers with which also known block copolymers of maleic anhydride and aromatic vinyl are miscible, such as, e.g., with poly(methyl methacrylate), polycarbonate, polyvinyl chloride, poly(ϵcaprolactone), as well as with those known poly(aromatic vinyl acrylonitrile) block copolymers, such as styrene-co-acrylonitrile copolymers. In the above-described polymer composition according to the invention these polymers can form both the first polymer phase and the second polymer phase.

The degree of miscibility can—as illustrated above—be adjusted, if required, by adjusting the maleic anhydride/aromatic vinyl compound ratio.

In a preferred embodiment the polymer composition according to the invention comprises a copolymer in which the available polyalkadiene blocks are based on polybutadiene which may or may not be hydrogenated. However, good results are also obtained by using other polyalkadienes, such as polymers of isoprene, pentadienes which may or may not be conjugated, hexadienes which may or may not se conjugated, etc.

These polyalkadiene blocks properly mix with all polymers with which the corresponding homopolymers of the alkadiene monomers also properly mix, in particular with polyalkenes. However, depending on the purpose of adding the block copolymer according to the invention, the polyalkadiene may be hydrogenated. When the block copolymer is used as compatibilizer in polyalkene-based blends, for instance, and preferably in polyethylene-based blends, hydrogenated polyalkadiene blocks are used in principle. When the block copolymer, however, is used as modifier for the mechanical properties of rubber compositions, it is used in non-hydrogenated form.

The polymer block consisting of maleic anhydride and an aromatic vinyl compound is a random polymer block. When maleic anhydride and styrene are combined in a monomer mixture, it turns out that maleic anhydride substantially always becomes implanted between two styrene units. The method of preparing this part of the copolymer to be used has to comply with special requirements, and in fact, only free radical polymerization techniques are eligible.

Thus, a polyalkadiene ((random (aromatic vinyl-co-maleic anhydride) polyalkadiene)$_n$) block copolymer, in which n≧1, is preferably obtained by thermal copolymerization of an aromatic vinyl compound and maleic anhydride, using polyalkadiene-based thermal iniferters as initiators. The iniferters can be obtained in the known manner, e.g. by carrying out end group reactions on, e.g., dihydroxy- and dicarboxy-terminated polyalkadienes.

Suitable iniferters are described in the article Kroeze et al. in Macromolecules 28 (1995) 28, document, the contents of which am inserted herein by reference.

In the above-described block copolymers all random maleic anhydride-aromatic vinyl compound blocks are surrounded on both sides by polyalkadiene blocks. However, this is not necessary. Similar results are actually found with block copolymers of the random aromatic vinyl compound-maleic anhydride-(polyalkadiene-(random aromatic vinyl compound-maleic anhydride))$_n$ type, in which n≧1. Such a triblock copolymer can be prepared by using macrophoto-iniferters. To this end, dichloro-terminated polyalkadiene, which, for instance, can be obtained by converting dihydroxy- or dicarboxy-terminated polyalkadiene with phosphorus pentachloride, is reacted with a dialkyldithiocarbamate, preferably the sodium salt thereof, and most preferably the sodium salt of diethyldithiocarbamate. This iniferter functions as photoinitiator. In the presence of this compound and using UV light, a copolymer with two random blocks from the monomer mixture can be obtained from a mixture of monomers (maleic anhydride, aromatic vinyl).

Such polymer structures and such a process are not described in the prior art and also form the subject of the present invention. Consequently, the invention also relates to a triblock copolymer of the (random aromatic vinyl compound-co-maleic anhydride)-polyalkadiene-(random aromatic vinyl compound-co-maleic anhydride) type; and to a process for preparing such a triblock copolymer in which a dichloro-terminated polyalkadiene is contacted with a dialkyldithiocarbamate, preferably the sodium salt thereof, to prepare a photoiniferter which is then brought into a mixture comprising maleic anhydride and aromatic vinyl, which mixture is subjected to a photopolymerization.

The polyalkadiene-poly(random aromatic vinyl compound-co-maleic anhydride) block copolymers can be hydrogenated in the conventional manner, e.g. with hydrogen, using Raney nickel, nickel on diatomaceous earth, copper chromate, molybdenum sulfide, finely divided platinum on carriers with a small specific surface area etc. Only alkene unsaturations are then hydrogenated.

The block copolymers forming the gist of the present invention not only possess favorable compatibilizing properties with which polymer compositions with improved morphology are obtained, using small amounts of compatibilizing agent, viz. compatibilizing agent/total polymer composition 1:500–1:50, more preferably 1:200–1:80, and most preferably about 1:100. They also possess properties leading to improved mechanical properties and in particular improved impact strength. The advantages in morphology modification and improvement in mechanical properties can be obtained with specific compositions in combination.

However, as for the composition the block copolymer can be adapted to the polymers or polymer mixtures which have to be improved as regards mechanical properties or morphological properties, e.g. by regulating the length of the alkadiene block, the length of the random block or the composition of the random block.

For a proper compatibility with polyalkenes it is generally required that the polyalkene block has a molecular weight of at least about 2,000, more preferably 3,000 or more.

Saturated polyalkene blocks can be excellently combined with linear polyalkenes, which may form both the first phase and the second phase in the polymer compositions according to the invention. When the copolymers are combined with a fraction of branched polyalkenes, the alkadiene monomer can be adapted thereto. Thus, an excellent compatibilizer on the basis of isoprene is obtained for polypropylene.

The random maleic anhydride-co-aromatic vinyl fraction usually has a molecular weight of at least 15,000–20,000, more preferably more than 25,000.

The maleic anhydride/aromatic vinyl compound ratio can readily be adjusted by varying the ratio in the monomer mixture. A research has shown that the maleic anhydride/aromatic vinyl compound ratio in the random block is higher than that in the starting monomer mixture.

The present invention will now be further explained with reference to the following non-limitative examples.

EXAMPLE 1

Preparation of an iniferter polymer based on dihydroxy polybutadiene (according to steps 1–3 of the scheme)

25.3 g dihydroxy-terminated polybutadiene (Aldrich) was dissolved in 250 ml toluene and dried by azeotropic distillation. After cooling to room temperature 3.35 g PCl$_5$ were added to the solution. This solution was allowed to stand overnight.

Toluene was removed by vacuum distillation. The polymer was dissolved in chloroform and washed twice with water. This was followed by drying over magnesium sulfate. Subsequently, filtration took place, the solvent was evaporated, and the polymer was dried in vacuum.

20 g of the thus obtained chloro-terminated polybutadiene (molecular weight 3300) was dissolved in a three-necked flask in 50 ml toluene under a nitrogen atmosphere. After adding 5.04 g piperazine the system was subjected overnight to reflux. Subsequently, the solution was cooled, filtered and extracted with methanol. The polymer was dried in vacuum.

The amine-terminated polybutadiene (20.3 g) was dissolved in 200 ml toluene under a nitrogen atmosphere. Added were 1 ml triethylamine and 1 ml CS$_2$, followed by a solution of I$_2$ in toluene, until the iodine was no longer consumed by the reaction. The mixture was filtered, after which the polymer was precipitated twice from toluene with a large excess of methanol at room temperature.

Thus, iniferters were obtained having an average molecular weight of 10400 and an average number of polybutadiene blocks of 2.9.

EXAMPLE 2
Preparation of an iniferter polymer based on dicarboxypolybutadiene Example 1 was repeated starting from dicarboxy-terminated polybutadiene (molecular weight 10200; Scientific Polymer Products Inc.). After the chlorination step no purification took place, but the product was directly subjected to a reaction with an excess of piperazine at −10 to −20° C. The amine-terminated polybutadiene was precipitated in cooled methanol (−50° C.). The reaction with $CS_2$ was carried out analogously to Example 1.

Thus, iniferters were obtained having an average molecular weight of 26500 and an average number of polybutadiene blocks of 2.5.

EXAMPLE 3
Preparation of a segmented block copolymer (according to step 4 of the scheme)

In an ampoule an amount of iniferter as prepared in Example 2 was brought under a nitrogen atmosphere. Styrene and maleic anhydride were added, after which the ampoule was placed in a thermostated oil bath (60° C.). During the polymerization continuous agitation took place. The block copolymers formed precipitated. After the required polymerization time (95 h) the mixture was cooled. Then the block copolymer was dissolved in THF and precipitated in methanol, which steps were repeated. After the second precipitation the resulting block copolymer was collected, washed with boiling petroleum ether (80–120° C.) to remove non-reacted maleic anhydride, and dried in vacuum for 24 h at 40° C.

Table 1 contains further data of the conducted reactions.

$$N_{pb}=M_{block\ copolymer} \cdot X_{pb}/M_{prepolymer} \quad (1)$$

$$N_{sma}=N_{pb}-1 \quad (2)$$

$$N_{alt}=N_{pb}+N_{sma}=2N_{pb}-1 \quad (3)$$

in which $x_{pb}$ represents the polybutadiene content of the block copolymer, and $N_{pb}$, $N_{sma}$ and $N_{alt}$ represent the average number of respectively polybutadiene blocks, poly(styrene-maleic anhydride) blocks and alternating blocks. The relation (2) follows from the assumption that no —SH end groups are present in the iniferter, which assumption is supported by the fact that no —SH peaks were found in FTIR spectra. From this it follows that all the final polymers begin and end with a polybutadiene block.

The obtained copolymer was hydrogenated in a three-necked flask provided with a reflux cooler under a nitrogen atmosphere. To this end, the copolymer was dissolved in dry toluene (about 1 g polymer per 50 ml toluene). Paratoluenesulfonylhydrazide and tri-n-propylamine were added, both in an amount of 2 mol per mol unsaturated alkene. This system was subjected to reflux for 2 h at 110° C. Subsequently, the polymer was isolated by washing with deionized water (2×100 ml) and precipitating in methanol. The recovered polymer was dried in vacuum. $^1$H-NMR measurements showed a degree of hydrogenation of more than 99%.

EXAMPLE 4
Preparation of polymer mixtures of nylon and polyethylene in a Brabander Plasticorder.

Mixtures of Nylon-6 (Aldrich) and LDPE (Stamylan LD 18008A, DSM Geleen, NL) (75/25) were prepared in a

TABLE 1

| [MI]/ [PIn]$_{eff}^{1/2}$ (mmol/l)$^a$ | f$_{MAn}$ in monomer feed (mol. %) | F$_{AN}$ in SMA (mol. %)$^b$ | Conversion of styrene (%) | Conversion of MAn (%) | Consumption PIn-10200 (%) | Mn block copolymer × 10$^{-5}$ | Number of alternating block copolymer | Wt. % SMA in block copolymer | SMA block length × 10$^{-4}$ |
|---|---|---|---|---|---|---|---|---|---|
| 127.4 | 5.82 | 33.5 | 6.2 | 50.9 | 67.2 | 1.6 | 11.8 | 57.1 | 1.7 |
| 130.6 | 10.62 | 42.9 | 13.2 | 83.7 | 90.0 | 5.0 | 28.0 | 69.8 | 2.6 |
| 140.0 | 21.65 | 50.1 | 22.2 | 80.7 | 98.7 | 5.3 | 23.0 | 76.3 | 3.7 |
| 148.6 | 11.41 | 42.5 | 13.2 | 75.6 | 97.9 | 3.8 | 18.0 | 74.0 | 3.9 |

$^a$)effective concentration of iniferter groups in PIn-10200.
$^b$)determined from % 0 in block copolymers, determined by elemental analysis and with $^1$H NMR.

This table shows that the length of the poly(styrene-co-maleic anhydride) blocks depends on the iniferter concentration. This gives an instrument for adjusting the length and composition of the random block.

The maleic anhydride content in the resulting polymers was calculated from the oxygen content; the polybutadiene content was calculated from the nitrogen content, which nitrogen originates from the iniferter groups, and by means of $^1$H-NMR. The oxygen and nitrogen contents were determined by known elemental analyses.

Table 1 shows that the maleic anhydride content in the obtained polymer is substantially higher than in the starting monomer mixture. Maleic anhydride and styrene tend to a high alternating sequence. This is also shown in FIG. 1.

In this figure the composition in the copolymer block is plotted against the monomer composition. It turns out that the maleic anhydride content rapidly moves to 50%. Even at low maleic anhydride contents in the monomer—mixture the maleic anhydride content in the block copolymer rapidly moves to 30–40%.

The average number of blocks in the multiblock copolymers was calculated as follows:

Brabander Plasticorder at a temperature of 230–240° C. and a rotation speed of 30 rpm for 5 min. The employed starting materials LDPE and Nylon-6 were previously dried for 8 h at 80° C. Added to the mixtures were 0.5; 1.0 and 1.5 wt. % of the block copolymer prepared according to Example 3.

The final mixtures were quenched in cold water and dried in vacuum for 2 days at 80° C. The products had excellent mechanical properties.

What is claimed is:
1. A block copolymer comprising at least one polyalkadiene block and at least one random (aromatic vinyl compound-co-maleic anhydride) block, the block copolymer being obtained by thermal copolymerization of an aromatic vinyl compound and maleic anhydride, using a poly alkadiene-based thermal iniferter or macro photoiniferter.
2. A block copolymer according to claim 1, wherein the aromatic vinyl compound is represented by formula I,

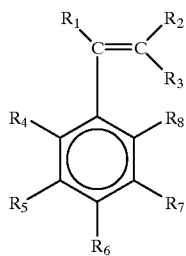

(I)

in which $R_{1-3}$ are independently selected from a hydrogen atom, a $C_{1-4}$ alkyl group or a $C_{1-4}$ alkyl group substituted with an inert group; and in which $R_{4-8}$ independently represent a hydrogen atom, a halogen atom, a $C_{1-4}$ alkyl group or a $C_{1-4}$ alkyl group substituted with an inert group.

3. A block copolymer according to claim 1, wherein the aromatic vinyl compound is styrene.

4. A block copolymer according to claim 1, wherein the polyaldakiene is polybutadiene.

5. A stable polymer composition comprising a continuous first phase formed by at least a first polymer, and a second phase dispersed therein comprising at least a second polymer, which second polymer is not compatible with the first polymer, and an amount of the block copolymer according to claim 1, the weight ratio of the block copolymer to the second polymer ranging between 1:50 and 1:5.

6. A polymer composition according to claim 1, wherein the block copolymer is polyalkadiene ((random (aromatic vinyl compound-co-maleic anhydride)-polyalkadiene)$_n$) block copolymer, in which $n \geq 1$.

7. A polymer composition according to claim 5, wherein the first polymer and the second polymer are polyethylene and polyamide or polyamide and polyethylene and the block copolymer is hydrogenated.

8. A polymer composition according to claim 5, wherein the ratio of the block copolymer to the second polymer ranges between 1:20 and 1:8.

9. The block copolymer of claim 1, comprising a random aromatic vinyl compound-co-maleic anhydride polyalkadiene random aromatic vinyl compound-co-maleic anhydride.

10. The stable polymer composition of claim 5, wherein the block copolymer comprising a random aromatic vinyl compound-co-maleic anhydride polyalkadiene random aromatic vinyl compound-co-maleic anhydride.

* * * * *